United States Patent
Godlewski (10) Patent No.: US 8,654,638 B2
(45) Date of Patent: Feb. 18, 2014

(54) DYNAMICALLY ADJUSTING BANDWIDTH USAGE AMONG SUBSCRIBER STREAMS

(76) Inventor: Marcin Godlewski, Lawrenceville, GA (US)

( * ) Notice: Subject to any disclaimer, the term of this patent is extended or adjusted under 35 U.S.C. 154(b) by 1391 days.

(21) Appl. No.: 11/612,524

(22) Filed: Dec. 19, 2006

(65) Prior Publication Data

US 2008/0144660 A1 Jun. 19, 2008

(51) Int. Cl.
*H04L 12/26* (2006.01)

(52) U.S. Cl.
USPC ........ 370/231; 370/279; 370/230.1; 370/234; 370/235

(58) Field of Classification Search
USPC .............. 370/468, 232, 231, 233, 234, 230.1, 370/230
See application file for complete search history.

(56) References Cited

U.S. PATENT DOCUMENTS

| | | | |
|---|---|---|---|
| 5,343,465 A | 8/1994 | Khalil | 370/232 |
| 5,491,531 A | 2/1996 | Adams et al. | 375/354 |
| 5,491,694 A | 2/1996 | Oliver et al. | 370/455 |
| 5,537,446 A | 7/1996 | Lakshman et al. | 375/371 |
| 5,570,355 A | 10/1996 | Dail et al. | 370/352 |
| 5,581,555 A | 12/1996 | Dubberly et al. | 370/487 |
| 5,594,726 A | 1/1997 | Thompson et al. | 370/485 |
| 5,659,787 A | 8/1997 | Schieltz | 709/226 |
| 5,678,041 A | 10/1997 | Baker et al. | 707/9 |
| 5,717,861 A | 2/1998 | Rabii | 709/232 |
| 5,719,872 A | 2/1998 | Dubberly et al. | 370/487 |
| 5,732,078 A | 3/1998 | Arango | 370/355 |
| 5,757,801 A | 5/1998 | Arimilli | 370/444 |
| 5,790,546 A | 8/1998 | Dobbins et al. | 370/400 |
| 5,796,724 A | 8/1998 | Rajamani | |
| 5,857,193 A | 1/1999 | Sutcliffe et al. | 707/10 |
| 5,867,764 A | 2/1999 | Williams | 725/125 |
| 5,881,231 A | 3/1999 | Takagi et al. | 709/212 |
| 5,884,037 A | 3/1999 | Aras et al. | 709/226 |
| 5,935,218 A | 8/1999 | Beyda et al. | 709/251 |

(Continued)

FOREIGN PATENT DOCUMENTS

| | | |
|---|---|---|
| CA | 2409904 | 5/2012 |
| EP | 0 613 316 | 8/1994 |

(Continued)

OTHER PUBLICATIONS

Sally Floyd et al., "Link-Sharing and Resource Management Models for Packet Networks," IEEE/ACM Transactions on Networking, vol. 3, No. 4, Aug. 1995, pp. 365-386.

(Continued)

*Primary Examiner* — Omer S Mian
(74) *Attorney, Agent, or Firm* — Merchant & Gould (57) ABSTRACT

Systems and methods are disclosed for adjusting bandwidth of streams carried on a subscriber loop. One exemplary method comprises the steps of: determining bandwidth in use on a subscriber loop; selecting, for adjustment, at least one of a plurality of TCP streams carried on the subscriber loop; and adjusting at least one flow control parameter of the selected TCP stream based on the bandwidth in use. An exemplary multimedia terminal adapter (MTA) comprises memory and a processor. The memory stores program code, and the code programs the processor to enable the MTA to: determine bandwidth in use on a subscriber loop; select, for adjustment, at least one of a plurality of TCP streams carried on the subscriber loop; and adjust at least one flow control parameter of the selected TCP stream based on the bandwidth in use.

19 Claims, 6 Drawing Sheets

(56) References Cited

U.S. PATENT DOCUMENTS

| | | | |
|---|---|---|---|
| 5,946,322 A | 8/1999 | Moura et al. | 370/468 |
| 5,953,344 A | 9/1999 | Dail et al. | 370/443 |
| 5,956,342 A | 9/1999 | Manning et al. | 370/414 |
| 5,963,557 A | 10/1999 | Eng | 370/432 |
| 5,963,963 A | 10/1999 | Schmuck et al. | 707/205 |
| 5,995,805 A | 11/1999 | Ogasawara et al. | 707/9 |
| 6,028,860 A | 2/2000 | Laubach et al. | 370/395.64 |
| 6,046,980 A | 4/2000 | Packer | 370/230 |
| 6,075,972 A | 6/2000 | Laubach et al. | |
| 6,084,855 A | 7/2000 | Soirinsuo et al. | 370/235 |
| 6,104,700 A | 8/2000 | Haddock et al. | 370/235 |
| 6,115,390 A | 9/2000 | Chuah | 370/443 |
| 6,125,105 A | 9/2000 | Edwards et al. | 370/230 |
| 6,151,582 A | 11/2000 | Huang et al. | 705/8 |
| 6,175,554 B1 | 1/2001 | Jang et al. | 370/229 |
| 6,208,640 B1 | 3/2001 | Spell et al. | 370/358 |
| 6,222,856 B1 | 4/2001 | Krishnan et al. | 370/464 |
| 6,223,042 B1 | 4/2001 | Raffel | 455/455 |
| 6,243,755 B1 | 6/2001 | Takagi et al. | 709/229 |
| 6,253,203 B1 | 6/2001 | O'Flaherty et al. | 707/9 |
| 6,272,110 B1 | 8/2001 | Tunnicliffe et al. | 370/232 |
| 6,275,824 B1 | 8/2001 | O'Flaherty et al. | 707/9 |
| 6,324,184 B1 | 11/2001 | Hou et al. | 370/468 |
| 6,343,085 B1 | 1/2002 | Krishnan et al. | |
| 6,363,445 B1 | 3/2002 | Jeddeloh | 710/113 |
| 6,408,336 B1 | 6/2002 | Schneider et al. | 709/229 |
| 6,438,141 B1 | 8/2002 | Hanko et al. | 370/477 |
| 6,442,158 B1 | 8/2002 | Beser | 370/352 |
| 6,473,794 B1 | 10/2002 | Guheen et al. | 709/223 |
| 6,477,144 B1 | 11/2002 | Morris et al. | 370/230.1 |
| 6,483,839 B1 | 11/2002 | Gemar et al. | 370/395.42 |
| 6,490,347 B2 | 12/2002 | DeCaluwe et al. | 379/211.01 |
| 6,493,446 B1 | 12/2002 | Cherry | |
| 6,510,162 B1 | 1/2003 | Fijolek et al. | 370/432 |
| 6,516,348 B1 | 2/2003 | MacFarlane et al. | 709/224 |
| 6,529,486 B1 | 3/2003 | Barnes et al. | 370/327 |
| 6,539,427 B1 | 3/2003 | Natarajan et al. | 709/224 |
| 6,542,463 B1 | 4/2003 | Heeke | 370/230 |
| 6,542,500 B1 | 4/2003 | Gerszberg et al. | 370/354 |
| 6,542,593 B1 | 4/2003 | Bowman-Amuah | 379/201.03 |
| 6,546,017 B1 | 4/2003 | Khaunte | 370/412 |
| 6,553,568 B1 | 4/2003 | Fijolek et al. | 725/111 |
| 6,560,243 B1 * | 5/2003 | Mogul | 370/468 |
| 6,563,829 B1 | 5/2003 | Lyles et al. | 370/395.21 |
| 6,567,418 B1 | 5/2003 | Farah | 370/437 |
| 6,577,597 B1 | 6/2003 | Natarajan et al. | 370/232 |
| 6,577,642 B1 | 6/2003 | Fijolek et al. | 370/465 |
| 6,580,723 B1 | 6/2003 | Chapman | 370/442 |
| 6,598,057 B1 | 7/2003 | Synnestvedt | 707/200 |
| 6,611,726 B1 | 8/2003 | Crosswhite | 700/99 |
| 6,615,166 B1 | 9/2003 | Guheen et al. | 703/27 |
| 6,636,482 B2 | 10/2003 | Cloonan et al. | 370/230 |
| 6,643,290 B1 | 11/2003 | Glade | 370/395.4 |
| 6,654,957 B1 | 11/2003 | Moore et al. | |
| 6,658,010 B1 | 12/2003 | Enns et al. | |
| 6,665,271 B1 | 12/2003 | Thomas et al. | 370/252 |
| 6,667,956 B2 | 12/2003 | Beshai et al. | 370/238 |
| 6,671,724 B1 | 12/2003 | Pandya et al. | 709/226 |
| 6,671,818 B1 | 12/2003 | Mikurak | 714/4 |
| 6,680,922 B1 | 1/2004 | Jorgensen | 370/328 |
| 6,701,342 B1 | 3/2004 | Bartz et al. | 709/200 |
| 6,715,075 B1 | 3/2004 | Loukianov | 713/176 |
| 6,754,177 B1 | 6/2004 | Gersht et al. | 370/233 |
| 6,754,228 B1 | 6/2004 | Ludwig | 370/468 |
| 6,763,000 B1 | 7/2004 | Walsh | 370/252 |
| 6,823,385 B2 | 11/2004 | McKinnon et al. | 709/226 |
| 6,845,106 B2 | 1/2005 | McKinnon et al. | 370/477 |
| 6,848,004 B1 | 1/2005 | Chang et al. | 709/232 |
| 6,850,764 B1 | 2/2005 | Patel | |
| 6,859,926 B1 | 2/2005 | Brenner et al. | |
| 6,865,170 B1 | 3/2005 | Zendle | |
| 6,882,623 B1 | 4/2005 | Goren et al. | |
| 6,912,232 B1 | 6/2005 | Duffield et al. | 370/468 |
| 6,917,614 B1 | 7/2005 | Laubach et al. | 370/392 |
| 6,917,622 B2 | 7/2005 | McKinnon et al. | 370/420 |
| 6,917,628 B2 | 7/2005 | McKinnin et al. | 370/468 |
| 6,993,044 B2 | 1/2006 | McKinnon et al. | 370/468 |
| 7,009,992 B2 | 3/2006 | McKinnon et al. | 370/443 |
| 7,065,779 B1 | 6/2006 | Crocker et al. | 725/111 |
| 7,068,597 B1 | 6/2006 | Fijolek | |
| 7,113,484 B1 | 9/2006 | Chapman et al. | 370/252 |
| 7,145,887 B1 | 12/2006 | Akgun et al. | 370/321 |
| 7,184,398 B2 | 2/2007 | McKinnon et al. | 370/230 |
| 7,274,667 B2 | 9/2007 | McKinnon et al. | 370/234 |
| 7,299,284 B2 | 11/2007 | McKinnon et al. | 709/225 |
| 7,333,495 B2 | 2/2008 | Sala et al. | 370/395.21 |
| 7,499,453 B2 | 3/2009 | Carlson et al. | 370/395.2 |
| 7,848,234 B2 | 12/2010 | McKinnon, III | |
| 7,856,497 B2 | 12/2010 | McKinnon, III et al. | |
| 7,920,594 B2 | 4/2011 | Carlson et al. | |
| 7,925,750 B2 | 4/2011 | McKinnon, III et al. | |
| 7,957,417 B2 | 6/2011 | McKinnon, III et al. | |
| 7,970,011 B2 | 6/2011 | Carlson et al. | |
| 7,983,272 B2 | 7/2011 | Carlson et al. | |
| 8,116,337 B2 | 2/2012 | Godlewski et al. | |
| 2001/0011247 A1 | 8/2001 | O'Flaherty et al. | 705/39 |
| 2002/0093912 A1 | 7/2002 | Gummalla et al. | |
| 2002/0118645 A1 | 8/2002 | Narayana et al. | 370/231 |
| 2002/0154655 A1 | 10/2002 | Gummalla et al. | 370/468 |
| 2002/0173316 A1 | 11/2002 | Jang et al. | 455/453 |
| 2004/0030797 A1 | 2/2004 | Akinlar et al. | |
| 2004/0184472 A1 | 9/2004 | Carroll | 370/442 |
| 2005/0018651 A1 | 1/2005 | Yan et al. | |
| 2005/0254419 A1 | 11/2005 | Barker et al. | 370/229 |
| 2006/0067333 A1 * | 3/2006 | Sivakumar et al. | 370/395.52 |
| 2006/0114926 A1 | 6/2006 | McKinnon et al. | 370/443 |
| 2006/0120282 A1 | 6/2006 | Carlson et al. | 370/229 |
| 2007/0058545 A1 | 3/2007 | Nookala et al. | 370/230 |
| 2007/0133409 A1 | 6/2007 | McKinnon, III et al. | 370/230 |
| 2008/0037578 A1 | 2/2008 | Carlson et al. | 370/463 |
| 2008/0112429 A1 | 5/2008 | McKinnon et al. | 370/442 |
| 2008/0144660 A1 | 6/2008 | Godlewski | 370/468 |
| 2009/0028176 A1 | 1/2009 | Godlewski et al. | 370/458 |
| 2009/0070454 A1 | 3/2009 | McKinnon, III et al. | 709/224 |
| 2009/0207731 A1 | 8/2009 | Carlson et al. | 370/232 |
| 2009/0213871 A1 | 8/2009 | Carlson et al. | 370/462 |

FOREIGN PATENT DOCUMENTS

| | | |
|---|---|---|
| EP | 0 742 658 | 11/1996 |
| WO | WO 99/27686 | 6/1999 |
| WO | WO 00/56021 A | 9/2000 |

OTHER PUBLICATIONS

X. Wang et al., "A predictive bandwidth management scheme and network architecture for real-time VBR traffic," Microprocessors and Microsystems, vol. 22, No. 10, May 1999, pp. 597-604.

Anurag Kumar et al., "Nonintrusive TCP Connection Admission Control for Bandwidth Management of an Internet Access Link," IEEE Communications Magazine, vol. 38, No. 5, May 2000, pp. 160-167.

Bhumip Khasnabish et al., "Bandwidth Management/Policing in ATM Networks for Serving Multi-Category Traffic using a Simple Learning Algorithm and a Bucket Bank," Global Telecommunications Conference, 1993, pp. 1149-1153.

IBM Technical Disclosure Bulletin #NB9203470.

Beauregard, Brian Conrad, "Overview of the Cable Modem," WPI Department of Electrical and Computer Engineering [online] Technologies Course Homepage, Mar. 23, 1996 [Retrieved on Dec. 18, 2000]. Retrieved from the Internet at <URL:http://www.ece.wpl.edu. courses/ee535/hwk96/hwk4cd/bcbeau/nodel.html>.

White, Gerry, "Additions to Cable Spec Enable QoS," [online] Article in Network World Fusion, Jun. 19, 2000 {Retrieved on Dec. 19, 2000. Retrieved from the Internet at <URL:http://www.nwfusion.com/cgl-bin.mailto/x.cgi>.

RiverDelta Networks, RiverDelta Networks Executive to Discuss Advanced Quality of Service Techniques at Cable-Tec Expo 2000 [online] Press Release, May 31, 2000 [Retrieved Dec. 19, 2000]. Retrieved from the Internet at <URL:http://www.riverdelta.com/pr053100.html>.

(56) References Cited

OTHER PUBLICATIONS

RiverDelta Networks, RiverDelta Raises $10 Million to Bring Enhanced Broadband Services to Next-Generation Cable Providers [online] Press Release, Dec. 19, 1999 [Retrieved Dec. 19, 2000]. Retrieved from the Internet at <URL:http://www.riverdelta.com/pr121399.html>.
RiverDelta Networks, QoS: One HFC Network, Multiple Revenue Streams [online] White Papers, [Retrieved on Dec. 19, 2000]. Retrieved from the Internet at <URL:http://www.cabledatacomnews.com/whitepapers/paper08.html>.
Telecommunications Online, RiverDelta Networks (www.riverdelta.com)—A One-Box MSA Solution [online] Newsletter article, Jul. 2000 [Retrieved on Dec. 10, 2000]. Retrieved from the Internet at <URL:http://www.telecommagazine.com/products/200007/20000701.html>.
White, Gerry, QoS: Enabling Multiple Services on Cable Networks, [online] Telecommunications Online Newsletter Article, Oct. 2000, [Retrieved on Dec. 19, 2000]. Retrieved from the Internet at <URL:http://www.telecoms.mag.com/issues.200010/tcs/qos.sub.--enabling.-html>.
International Engineering Consortium, How Cable Modems Work [online] Web ProForum Tutorial Course, Aug. 2, 2000 [Retrieved on Dec. 18, 2000]. Retrieved from the Internet at <URL:http://www.iec/org/tutorials/cable.sub.-mod/topic01.html?Nest.x=-34XNext.y=20>.
International Engineering Consortium, Cable Data System Features [online] Web ProForum Tutorial Course, Aug. 3, 2000 [Retrieved on Dec. 18, 2000]. Retrieved from the Internet at <URL:http://www.iec/org/tutorials/cable/sub.--mod/topic02.html>.
International Engineering Consortium, Cable Data Network Architecture [online] Web ProForum Tutorial Course, Aug. 2, 2000 [Retrieved on Dec. 18, 2000]. Retrieved from the Internet at <URL:http://www.iec/org/tutorials/cable.sub.--mod/topic03.html>.
International Engineering Consortium, Cable Data Network Standards [online] Web ProForum Tutorial Course, Aug. 3, 2000 [Retrieved on Dec. 18, 2000]. Retrieved from the Internet at <URL:http://www.iec/org/tutorials/cable.sub.--mod/topic04.html?Next.x=-40&Next.y=18>.
Ostergaard, Rolf B., Cable Modems.Org: Your Cable Modem Reference Guide, [online] Tutorial 1998-2000 [Retrieved on Dec. 18, 2000]. Retrieved from Internet at <URL:http://www.cable-modems.org/tutorial>.
Time Warner Cable, Road Runner Subscription Agreement, Jan. 1999, pp. 1-4.
White, Gerry, Eliminating Open Access Technology Barriers [online] Telecommunications Online Newsletter Article, Jul. 2000 [Retrieved on Dec. 10, 2000]. Retrieved from the Internet at <URL:http://telecommagazine.com/issues/20007/tcs/elimin.html>.
Green, Tim, DSL Has a Secret [online] Network World Fusion Article, Mar. 2, 1999 [Retrieved on Dec. 22, 2000]. Retrieved from the Internet at <URL:http://cnn.com/TECH/computing/9903/02/dslsecretlidg/>.
Cable Television Laboratories, Inc., Cable Data Modem Performance Evaluation: A Primer for Non-Technical Readers, Nov. 15, 1996, pp. 1-8.
RiverDelta Networks, Inc., QoS: The Key to Maximizing Revenue: A Technical Guide for Cable Operators [online] PDF Document, Publication Date Unknown [Retrieved on Dec. 18, 2000]. Retrieved from Internet at <URL:http://www.riverdelta.com>, pp. 1-8.
Cable Television Laboratories, Inc., Cable Data Modem Performance Evaluation: A Primer for Non-Technical Readers, Apr. 1996, pp. 1-3.
Ddri Diversified Data Resources, Inc., ACE-SNMP Web Based SNMP Network Management System an Introductory Overview of SNMP, 1999, <URL:http://www.ddri.com>, pp. 1-32.
Data-Over-Cable Service Interface Specifications, Radio Frequency Interface Specification, SP-RFv1.-104-00047 Interim Specification; 2000 Cable Television Laboratories, Inc., 1999, pp. 229-231, 263, 121-141, 157-217, and 277-283.
U.S. Office Action dated Jul. 6, 2004 cited in U.S. Appl. No. 09/800,861.
U.S. Office Action dated Sep. 16, 2004 cited in U.S. Appl. No. 09/800,735.
U.S. Office Action dated Dec. 2, 2004 cited in U.S. Appl. No. 09/801,155.
U.S. Office Action dated Dec. 15, 2004 cited in U.S. Appl. No. 09/800,717.
U.S. Office Action dated Dec. 16, 2004 cited in U.S. Appl. No. 09/800,608.
U.S. Office Action dated Apr. 11, 2005 cited in U.S. Appl. No. 09/801,155.
U.S. Office Action dated May 4, 2005 cited in U.S. Appl. No. 09/800,608.
U.S. Office Action dated May 19, 2005 cited in U.S. Appl. No. 09/800,735.
U.S. Office Action dated May 27, 2005 cited in U.S. Appl. No. 09/935,514.
U.S. Office Action dated Jun. 13, 2005 cited in U.S. Appl. No. 09/800,717.
U.S. Final Office Action dated Oct. 31, 2005 cited in U.S. Appl. No. 09/800,608.
U.S. Office Action dated Nov. 16, 2005 cited in U.S. Appl. No. 09/935,514.
U.S. Office Action dated Dec. 14, 2005 cited in U.S. Appl. No. 09/800,717.
U.S. Office Action dated Jan. 5, 2006 cited in U.S. Appl. No. 09/935,514.
U.S. Office Action dated Apr. 20, 2006 cited in U.S. Appl. No. 09/800,608.
U.S. Office Action dated May 30, 2006 cited in U.S. Appl. No. 09/800,717.
U.S. Office Action dated Jun. 30, 2006 cited in U.S. Appl. No. 09/935,514.
U.S. Final Office Action dated Oct. 4, 2006 cited in U.S. Appl. No. 09/800,608.
U.S. Final Office Action dated Nov. 16, 2006 cited in U.S. Appl. No. 09/800,717.
U.S. Office Action dated Jan. 29, 2007 cited in U.S. Appl. No. 09/800,608.
U.S. Office Action dated Jul. 24, 2007 cited in U.S. Appl. No. 10/410,878.
U.S. Office Action dated Apr. 16, 2008 cited in U.S. Appl. No. 10/410,878.
U.S. Office Action dated Dec. 22, 2008 cited in U.S. Appl. No. 11/275,208.
U.S. Office Action dated Apr. 15, 2009 cited in U.S. Appl. No. 11/676,318.
U.S. Office Action dated Apr. 29, 2009 cited in U.S. Appl. No. 10/276,654.
U.S. Office Action dated May 12, 2009 cited in U.S. Appl. No. 11/856,761.
U.S. Final Office Action dated May 13, 2009 cited in U.S. Appl. No. 11/275,208.
U.S. Office Action dated Jun. 16, 2009 cited in U.S. Appl. No. 11/875,208.
U.S. Office Action dated Jul. 30, 2009 cited in U.S. Appl. No. 11/829,209.
International Search Report dated Aug. 28, 2008 cited in PCT/US2008/070847.
European Official Communication dated Jun. 4, 2009 cited in Application No. 01914723.0.
PCT Search Report dated Jun. 5, 2008 cited in International Application No. PCT/US2007/086945.
U.S. Final Office Action dated Nov. 24, 2009 cited in U.S. Appl. No. 11/676,318 , 32 pgs.
U.S. Office Action dated Nov. 24, 2009 cited in U.S. Appl. No. 11/856,761, 19 pgs.
U.S. Final Office Action dated Nov. 25, 2009 cited in U.S. Appl. No. 10/276,654, 29 pgs.
U.S. Office Action dated Jan. 5, 2010 cited in U.S. Appl. No. 11/829,209, 26 pgs.
U.S. Office Action dated May 10, 2010 cited in U.S. Appl. No. 12/388,663, 37 pgs.

(56) References Cited

OTHER PUBLICATIONS

U.S. Office Action dated May 24, 2010 cited in U.S. Appl. No. 11/856,761, 15 pgs.
U.S. Final Office Action dated Jul. 16, 2010 cited in U.S. Appl. No. 11/829,209, 23 pgs.
U.S. Office Action dated Aug. 3, 2010 cited in U.S. Appl. No. 11/275,208, 12 pgs.
U.S. Office Action dated Sep. 17, 2010 cited in U.S. Appl. No. 12/388,659, 31 pgs.
U.S. Final Office Action dated Sep. 23, 2010 cited in U.S. Appl. No. 12/388,663, 9 pgs.
U.S. Final Office Action dated Nov. 2, 2010 cited in U.S. Appl. No. 11/856,761, 12 pgs.
U.S. Office Action dated Feb. 14, 2011 cited in U.S. Appl. No. 11/829,209, 26 pgs.
U.S. Final Office Action dated Aug. 3, 2011 cited in U.S. Appl. No. 11/829,209, 31 pgs.
European International Preliminary Report dated Jun. 23, 2009 cited in Application No. PCT/US2007/086945, 7 pgs.
Canadian Office Action dated Oct. 14, 2009 cited in Application No. 2,409,904, 4 pgs.
European Examination Report dated Nov. 18, 2009 cited in Application No. 01 914 723.0-2416, 4 pgs.
International Preliminary Report on Patentability mailed Feb. 11, 2010 cited in Application No. PCT/US2008/070847, 8 pgs.
European Official Communication dated Jun. 9, 2010 cited in Application No. 07 865 457.1, 3 pgs.
Chinese First Office Action dated Jan. 31, 2012 cited in Application No. 200880100570.0, 12 pgs.
European Official Communication dated Feb. 21, 2011 cited in Application No. 08 796 469.8, 6 pgs.
Canadian Office Action dated May 4, 2012 cited in Application No. 2,673,548, 2 pgs.
European Office Action dated May 8, 2012 cited in Application No. 07 865 457.1, 6 pgs.
Canadian Office Action dated Dec. 5, 2012 cited in Application No. 2,673,548, 3 pgs.
Canadian Office Action dated Jun. 4, 2013 cited in Application No. 2,673,548, 4 pgs.

* cited by examiner

DYNAMICALLY ADJUSTING BANDWIDTH USAGE AMONG SUBSCRIBER STREAMS

CROSS REFERENCE TO RELATED APPLICATIONS

Not applicable.

FIELD OF THE DISCLOSURE

The present disclosure relates to digital terminal adapters, and more specifically, to systems and methods of adjusting the bandwidth usage of digital terminal adapters.

BACKGROUND

A growing number of consumers now have high speed, or broadband, connections to the Internet in their homes. The increased bandwidth provided by these broadband connections allows the delivery of media services, such as telephone, digital television, and/or video, to a multimedia terminal adapter (MTA) located in the home. Several of these technologies use one or more protocols in the Internet Protocol (IP) family as a delivery mechanism. In the telephony context, this technology is known as Voice over IP (VoIP). In the video context, this technology is known as IP television, or IPTV.

The IP family of protocols uses a layered approach, with IP itself acting as the network layer protocol. Sitting on top of the IP network layer is a transport layer such as TCP (Transmission Control Protocol) or User Data Protocol (UDP). The IP family also includes a variety of session layer protocols above the transport layer, such as Hypertext Transport Protocol (HTTP), File Transfer Protocol (FTP), Real-Time Transport Protocol (RTP), Real-Time Transport Control Protocol (RTCP) and Session Description Protocol (SDP). IPTV delivers video or television as a Motion Pictures Experts Group (MPEG) transport stream, carried by UDP/IP, or RTP/UDP/IP. VoIP carries the voiceband data in an RTP/UDP/IP stream, uses SDP for call setup and signaling, and RTCP to monitor quality of service (QoS).

Typically, each service (e.g., data, voice, video) is carried as a separate stream within the single broadband connection to the home. Furthermore, each instance of a service is itself a separate stream. Thus, when the home is using the MTA to make a VoIP phone call, to watch an IPTV channel, to browse a web page, and to download a file, this results in at least four simultaneous streams. In a conventional MTA, the streams within the MTA are unaware of each other, and no centralized entity manages the bandwidth of the broadband connection. Therefore, in a conventional MTA the amount of bandwidth that is used by a particular stream depends on the remote transmitter (i.e., the video program source, the web server, or the phone). If too much bandwidth is used by data services, media packets may be dropped, and the usability of media services can be adversely affected. Thus, a need arises for these and other problems to be addressed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
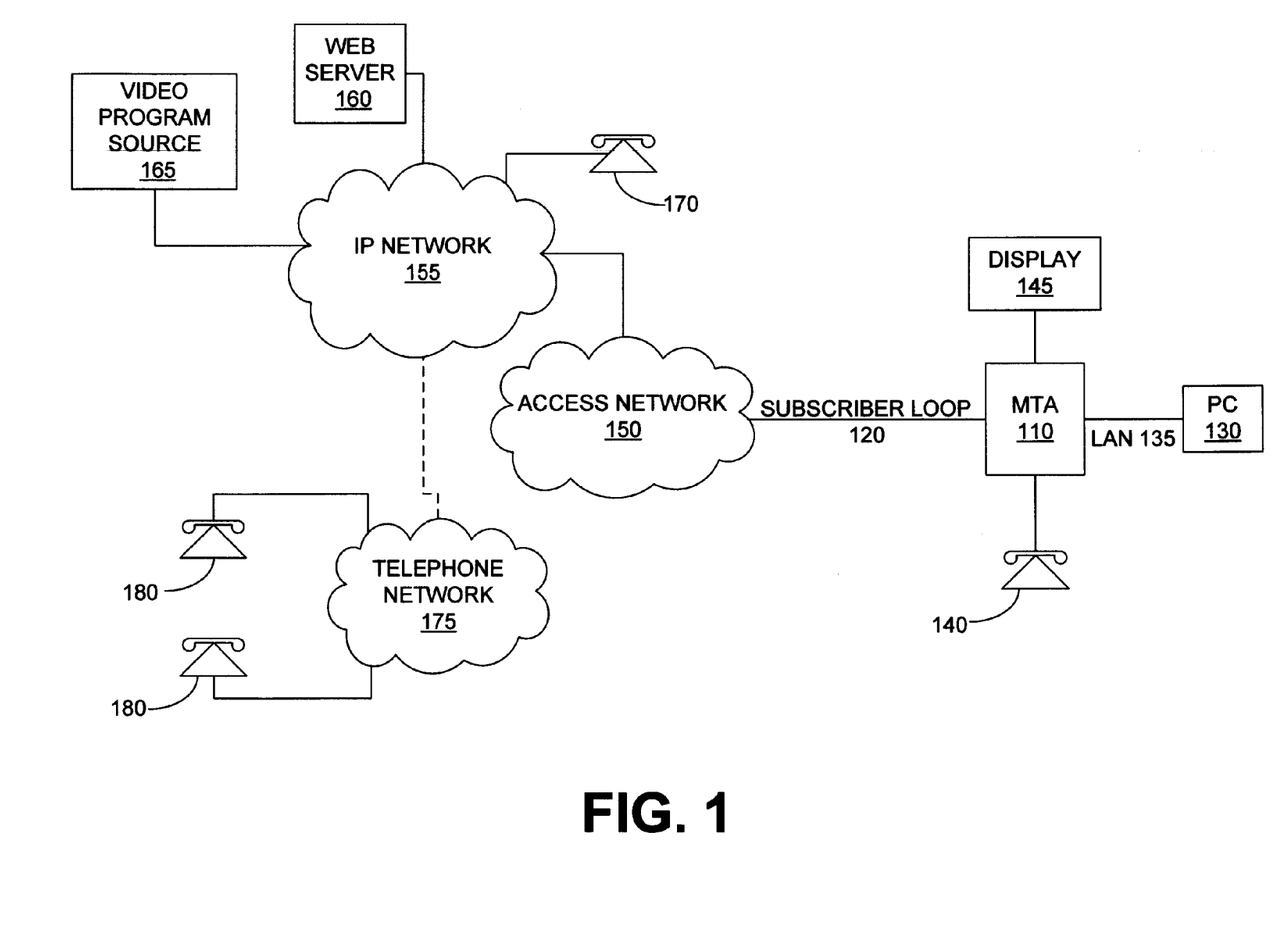
FIG. 1 is a block diagram of an environment in which one embodiment of a system and method of dynamically adjusting bandwidth usage among subscriber streams is located.

FIG. 1 is a block diagram of an environment in which one embodiment of a system and method of dynamically adjusting bandwidth usage among subscriber streams is located. A multimedia terminal adapter (MTA) 110 receives Internet data services as well as IP-transported media services over a local subscriber loop 120. The media services may include, but are not limited to, voice over IP (VoIP) telephone services, IP television (IPTV) services, IP video services, and/or IP music or audio services. The implementation of the subscriber loop 120 depends on the service provider: in some embodiments, the subscriber loop 120 is implemented over twisted copper pair(s) telephone lines using digital subscriber loop (DSL). In other embodiments, the subscriber loop 120 is uses coax, hybrid fiber-coax (HFC), or fiber cabling, among other possible transmission mediums. In still other embodiments, the subscriber loop 120 is implemented using a wireless connection, for example, WiFi (IEEE 802.11) or WiMAX (IEEE 802.16).

The MTA 110 is coupled to one or more peripheral devices, as appropriate for the media service(s) provided to the subscriber. According to the exemplary embodiment of FIG. 1, a PC 130 coupled to the MTA 110 by a local area network (LAN) link 135 receives Internet data access through the MTA 110, a telephone 140 provides the user with VoIP telephone service through the MTA 110, and a display 145 provides the user with IPTV or IP video services through the MTA 110. In other embodiments of MTA 110, a speaker (not shown) provides the user with IP music or audio services through the MTA 110. Various other embodiments of MTA 110 provide combinations of these services, and other IP media services, to appropriate devices.

These data and/or media services are received by the MTA 110 over an access network 150 coupled to the subscriber loop 120. The access network 150 is coupled to an Internet Protocol (IP) network 155, such as the Internet. The access network 150 thus gives the MTA 110 access to other computers coupled to the IP network 155, such as, for example, a Web server 160.

According to embodiments in which the access network 150 provides IP video services to the MTA 110, at least one video programming source 165 is coupled to the IP network 155. The IP video programming stream is transmitted through the IP network 155, through the access network 150, then over subscriber loop 120 to MTA 110. The MTA 110 converts the stream of IP packets into a video signal, and supplies the video signal to the display 145 for viewing by the subscriber. In some embodiments, display 145 is a television. In other embodiments, display 145 is a computer monitor.

According to embodiments in which the access network 150 provides IP music or audio services to the MTA 110, at least one music programming source (not shown) is coupled to the IP network 155. The IP music program stream is transmitted through the IP network 155, through the access network 150, then over subscriber loop 120 to MTA 110. The MTA 110 converts the stream of IP packets into an audio signal, and supplies the signal to speakers (not shown).

According to embodiments which support voice over IP, the MTA 110 receives an analog voiceband signal from the telephone 140, converts the signal to a stream of VoIP packets, and transmits the VoIP stream over the subscriber loop 120. From the subscriber loop 120, the VoIP stream is transmitted through the access network 150 and through the IP network 155. A similar communication occurs in the reverse direction: the MTA 110 receives a stream of VoIP packets over the subscriber loop 120, converts the VoIP packets into an analog voiceband signal, and supplies the voiceband signal to the telephone 140.

In these VoIP embodiments, a subscriber to the media service can use telephone 140 can make calls to, and receive calls from, any of VoIP telephones 170 that are connected to the IP network 155. In some VoIP embodiments, the IP network 155 is also coupled to a telephone network 175, such as the Public Switched Telephone Network (PSTN). The subscriber can then use MTA 110 to make calls to, and receive calls from, any of telephones 180 which are coupled to the telephone network 175.

Figure 2:
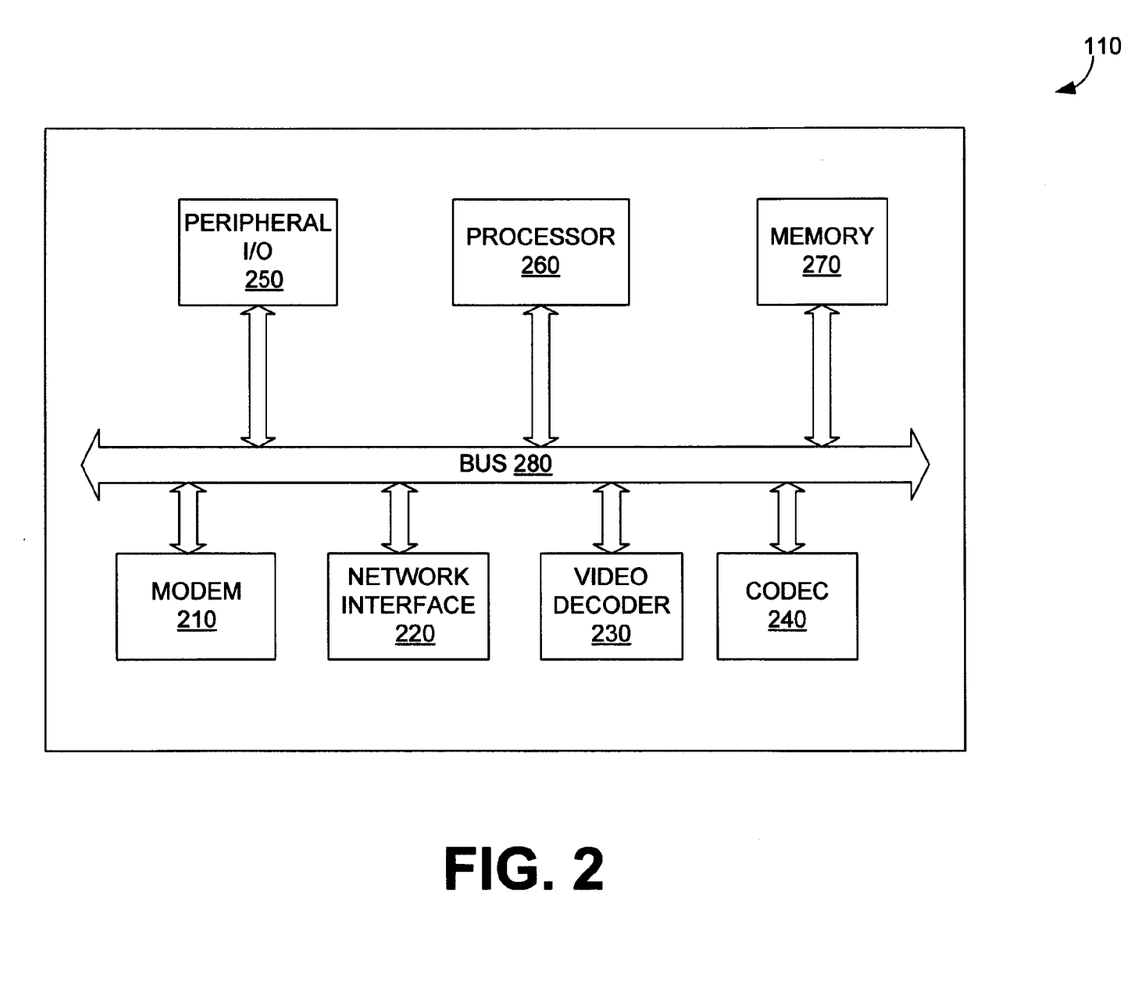
FIG. 2 is a block diagram depicting selected components of the MTA from FIG. 1.

FIG. 2 is a block diagram showing selected components of an exemplary MTA 110 which implements embodiments of the systems and methods of dynamically adjusting bandwidth usage among subscriber streams disclosed herein. MTA 110 comprises: a modem 210; a local network interface 220; a video decoder module 230; a voice coder/decoder, or codec 240; a peripheral I/O interface 250; a processor 260; and memory 270. These components are communicatively coupled by a data bus 280.

The memory 270 contains instructions that are executed by the processor 260 to control operations of the MTA 110. The peripheral I/O interface 250 provides input and output signals, for example, user inputs from a remote control or front panel buttons or a keyboard, and outputs such as LEDs or an LCD on an exterior panel.

The modem 210 sends and receives signals over the subscriber loop 120. In some embodiments, for example, the modem 210 is a "cable modem" and, in other embodiments, the modem 210 is a "DSL modem". In some embodiments, for example, WiFi or WiMAX, the modem takes the form of a network adapter rather than a modem.

The modem 210 may be integrated into the MTA 110, or may be a separate device with a layer-1 or local area network (LAN) connection to the MTA 110, such as Ethernet. The modem 210 supplies the processor 260 with a stream of packets received over the subscriber loop 120, containing data, voice, and/or video. The data packets, after optional processing by the processor 260, are supplied to the network interface 220, which is coupled to the PC 130 (FIG. 1). In the reverse direction, the processor 260 receives data packets over the network interface 220 and, after optional processing, the packets are provided to the modem 210 for transmission over the subscriber loop 120.

Voice packets received by the modem 210 are handled as follows. The voice packets are processed by the processor 260, then the packets or packet payloads are supplied to the codec 240. The codec converts the digital voice data in the packets to an analog voiceband signal. In the reverse direction, the codec 240 receives an analog voiceband signal and converts the signal to digital voice data. The digital voice data is packetized into VoIP packets, and the VoIP packets are provided by the processor 260 to the modem 210 for transmission over the subscriber loop 120.

Video packets received by the modem 210 are handled as follows. The video packets are processed by the processor 260, then the packets or packet payloads are supplied to the video decoder 230. The video decoder 230 demultiplexes, decrypts and/or decodes the video-over-IP packets into a stream of decoded video frames. The frames are then converted into a video signal supplied to the display 145 (see FIG. 1).

Omitted from FIG. 2 are a number of conventional components, known to those skilled in the art, that are unnecessary to explain the operation of the systems and methods of dynamically adjusting bandwidth usage among subscriber streams disclosed herein. A person of ordinary skill in the art should understand that software components referred to herein include executable code that is packaged, for example, as a standalone executable file, a library, a shared library, a loadable module, a driver, or an assembly, as well as interpreted code that is packaged, for example, as a class.

Figure 3A:
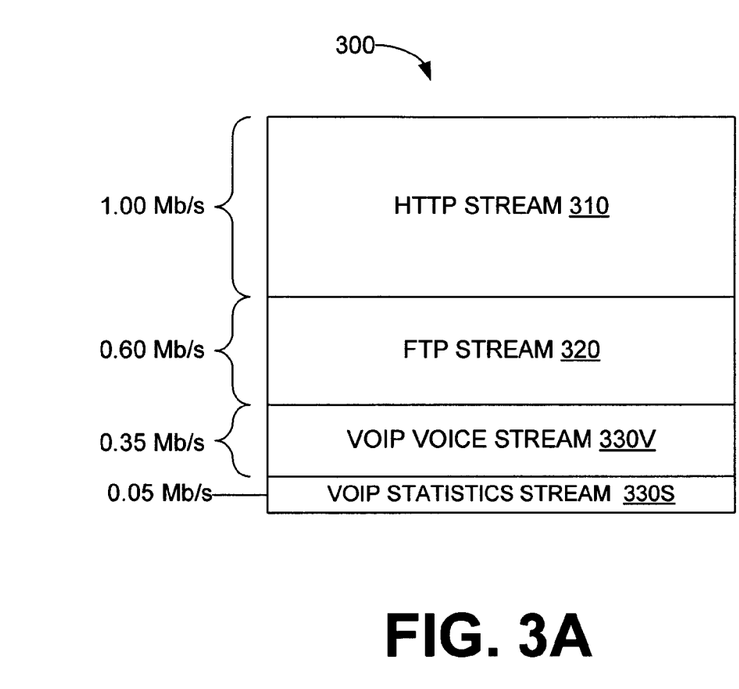
FIGS. 3A and 3B illustrate the relative usage of bandwidth by streams received by the MTA from FIG. 1.
Figure 3B:
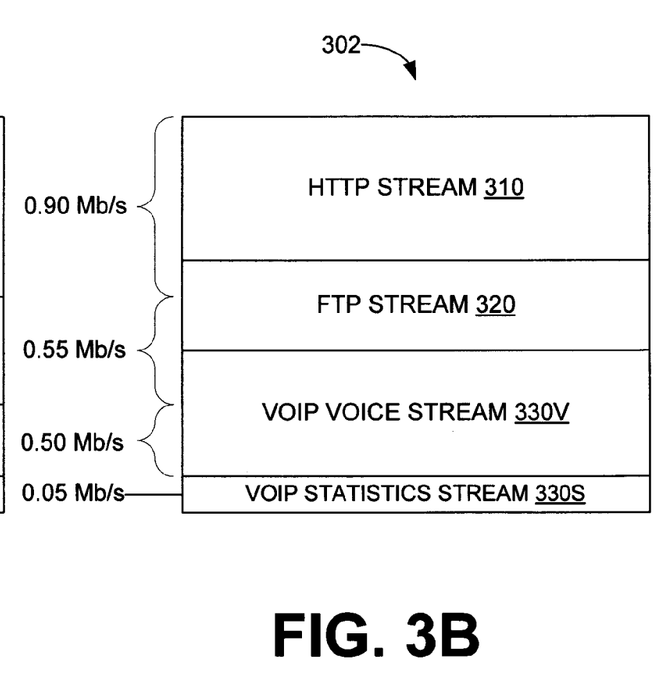

As explained earlier, each instance of a data and/or media service can be carried in one or more separate streams on subscriber loop 120. Certain embodiments of the systems and methods disclosed herein operate to dynamically adjust the relative usage of the bandwidth by these streams. The effect of this adjustment is illustrated by FIGS. 3A and 3B. In this example, the bandwidth of the subscriber loop 120 is 2.0 Mbits/sec, and four streams are carried by subscriber loop 120 to the MTA 110 in the downstream (Internet to subscriber) direction: an HTTP stream 310; an FTP stream 320; and a VoIP stream 330 which includes an RTP (voice) stream 330V and an RTCP (control and statistics) stream 330S. FIG. 3A depicts a chart 300 illustrating the relative usage of bandwidth by these four streams, under initial conditions: the HTTP stream 310 uses 1.0 Mbits/sec; the FTP stream 320 uses 0.6 Mbits/sec; the RTP stream 330V uses 0.35 Mbits/sec; and the RTCP stream 330S uses 0.05 MBits/sec.

FIG. 3B depicts a chart 302 illustrating the relative usage of bandwidth by these four streams after adjustment by an embodiment of the systems and/or methods disclosed herein. Specifically, chart 302 depicts that the bandwidth used by the HTTP stream 310 has been decreased by 0.1 MBits/sec (10%), to 0.9 Mbits/sec. The bandwidth used by the FTP stream 320 has been decreased by 0.05 MBits/sec (8%) to 0.55 Mbits/sec. The bandwidth used by the RTCP stream 330S remains the same, at 0.05 MBits/sec. The bandwidth used by the RTP stream 330V has been increased by 0.15 Mbits/sec, to 0.50 Mbits/sec. Thus, the bandwidth adjustment methods and systems disclosed herein have, in effect, taken 0.15 Mbits/sec of bandwidth from the two data streams 310 and 320 and given this bandwidth to the VoIP voice stream 330V. Such a bandwidth adjustment operation will now be described in further detail.

Figure 4:
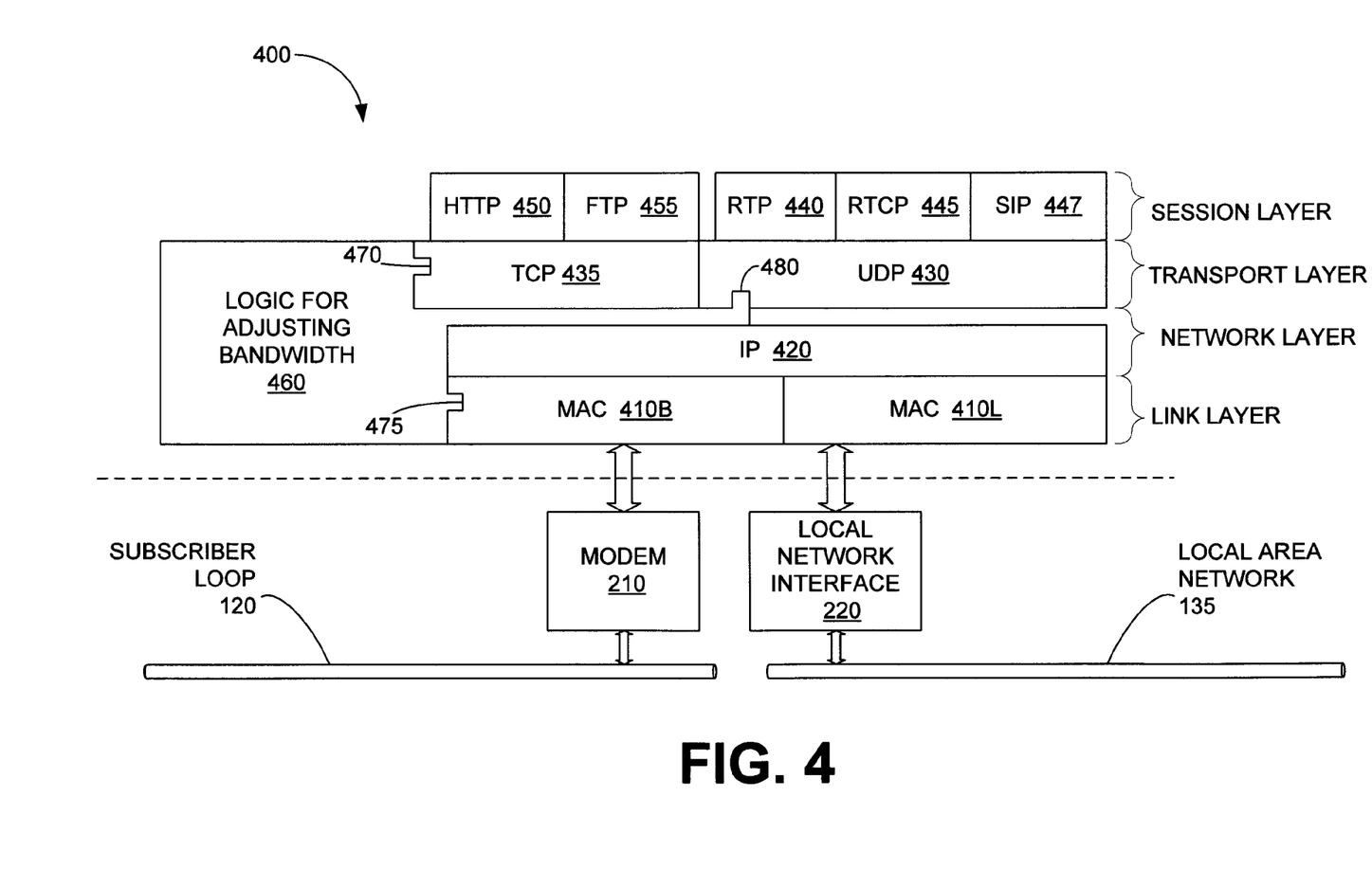
FIG. 4 is a block diagram showing a protocol stack implemented by one embodiment of the MTA of FIG. 1.

FIG. 4 is a block diagram showing a protocol stack 400 implemented by an embodiment of the MTA 110, including logic for dynamically adjusting bandwidth usage among subscriber streams. A person of ordinary skill in the art should understand that the logic described in FIG. 4 can be implemented in software, that is, executed from memory 270 by processor 260 (see FIG. 2). Exemplary embodiments of processor 260 include a microprocessor, a microcontroller, a network processor, and a reconfigurable processor. A person of ordinary skill in the art should also understand that some or all of the logic can be implemented in hardware, including, but not limited to, a programmable logic device (PLD), programmable gate array (PGA), field programmable gate array (FPGA) or an application-specific integrated circuit (ASIC).

As described earlier in connection with FIG. 2, the MTA 110 has two network interfaces: a modem interface 210 connected to the subscriber loop 120, and a local network interface 220 connected to the subscriber LAN 135. Each interface (210, 220) receives packets, from its respective connection, in a particular layer-1 format, specific to the type of connection (e.g., DSL, HFC, twisted-pair Ethernet, etc.). Similarly, packets transmitted by an interface are in a particular layer-1 format, specific to the connection type.

Interfaces 210 and 220 bind to the protocol stack 400 at the media access control (MAC) layer, also known as layer-2, or the link layer. (A person of ordinary skill in the art should be familiar with the OSI layered model of a protocol stack.) More specifically, modem interface 210 binds to a first MAC instance 410B, and LAN interface 220 binds to a second MAC instance 410L. Typically, these MAC instances 410B and 410L are implemented as a device driver.

A person of ordinary skill in the art should be familiar with layered protocol stacks. Each layer examines its own layer-specific header and/or trailer, processes the packet accordingly, and passes the packet up to the appropriate protocol above. On receipt of a frame from the interface (210, 220) the MAC instance (410B, 410L) removes the layer-2 packet that is encapsulated within the layer-1 frame, and provides the incoming layer-2 packet to the IP module 420. The IP module 420 forwards the layer-4 packet encapsulated within the received layer-3 IP packet to either the UDP module 430 or the TCP module 435, based on the contents of the layer-3 header. In a similar manner, the UDP module 430 passes incoming layer-5 packets up to either the RTP module 440, the RTCP module 445, or the SIP module 447, and the TCP module 435 passes incoming packets up to either the HTTP module 450 or the FTP module 455. Packets flow in the reverse direction (down the stack) in an analogous manner, as should be understood by a person of ordinary skill in the art.

However, unlike conventional MTA 110, the protocol stack 400 includes logic for adjusting stream bandwidth 460. The logic for adjusting stream bandwidth 460 includes an interface (470) to the TCP module 435, an interface (475) to the broadband MAC instance 410B, and an interface (480) to the UDP module 430.

The interface 470 is shown in FIG. 4 as connecting to the side of the TCP module 435, rather than to the top or bottom of the TCP module 435, because the interface 470 provides a control path rather than a data path. That is, adjustment logic 460 does not accept packets from, or provide packets to, the TCP module 435, but instead controls the behavior of the TCP module 435 in order to adjust the bandwidth used by TCP streams (e.g., HTTP stream 310 and FTP stream 320 from FIG. 3).

Similarly, the interface 475 is shown in FIG. 4 as a control path rather than a data path, connecting to the side of the broadband MAC instance 410B. The adjustment logic 460 receives status indications and information from the MAC instance 410B and uses the status information to periodically determine the total bandwidth in use in broadband subscriber loop 120, and the relative bandwidth used by each of the streams carried by the broadband subscriber loop 120.

As a person of ordinary skill in the art should appreciate, when bandwidth in use approaches the maximum, packets are likely to be dropped on some streams. Although throughput on TCP streams may suffer when packets are dropped, TCP streams are relatively tolerant of dropped packets, since TCP is a connection protocol that provides retransmission. UDP streams, on the other hand, are not tolerant of dropped packets, since UDP is a datagram protocol and provides no retransmission. For applications or clients that use UDP, such as VoIP and IPTV, the quality of service will suffer when bandwidth usage approaches maximum and packets are dropped.

The adjustment logic 460 alleviates this problem by monitoring total bandwidth in use on the broadband subscriber loop 120, and acting when the total bandwidth in use reaches a threshold. At this threshold, the adjustment logic 460 uses the control path into the TCP module 435 to affect the TCP flow control mechanism on one or more streams, thereby adjusting the bandwidth used by the selected TCP streams. In one embodiment, the adjustment logic 460 ceases to make flow control parameter adjustments when the total bandwidth in use drops below a threshold. (In some embodiments, two separate thresholds are used.)

Notably, the adjustment logic 460 does not directly adjust the bandwidth used by UDP streams (e.g., VoIP streams 330V and 330S from FIG. 3), since UDP streams are not connection-oriented and thus have no flow control mechanisms. However, a person of ordinary skill in the art should understand how, given a fixed amount of bandwidth in the subscriber loop 120, decreasing the bandwidth used by the TCP streams will free up bandwidth for use by the UDP streams carrying voice and video.

Figure 5:
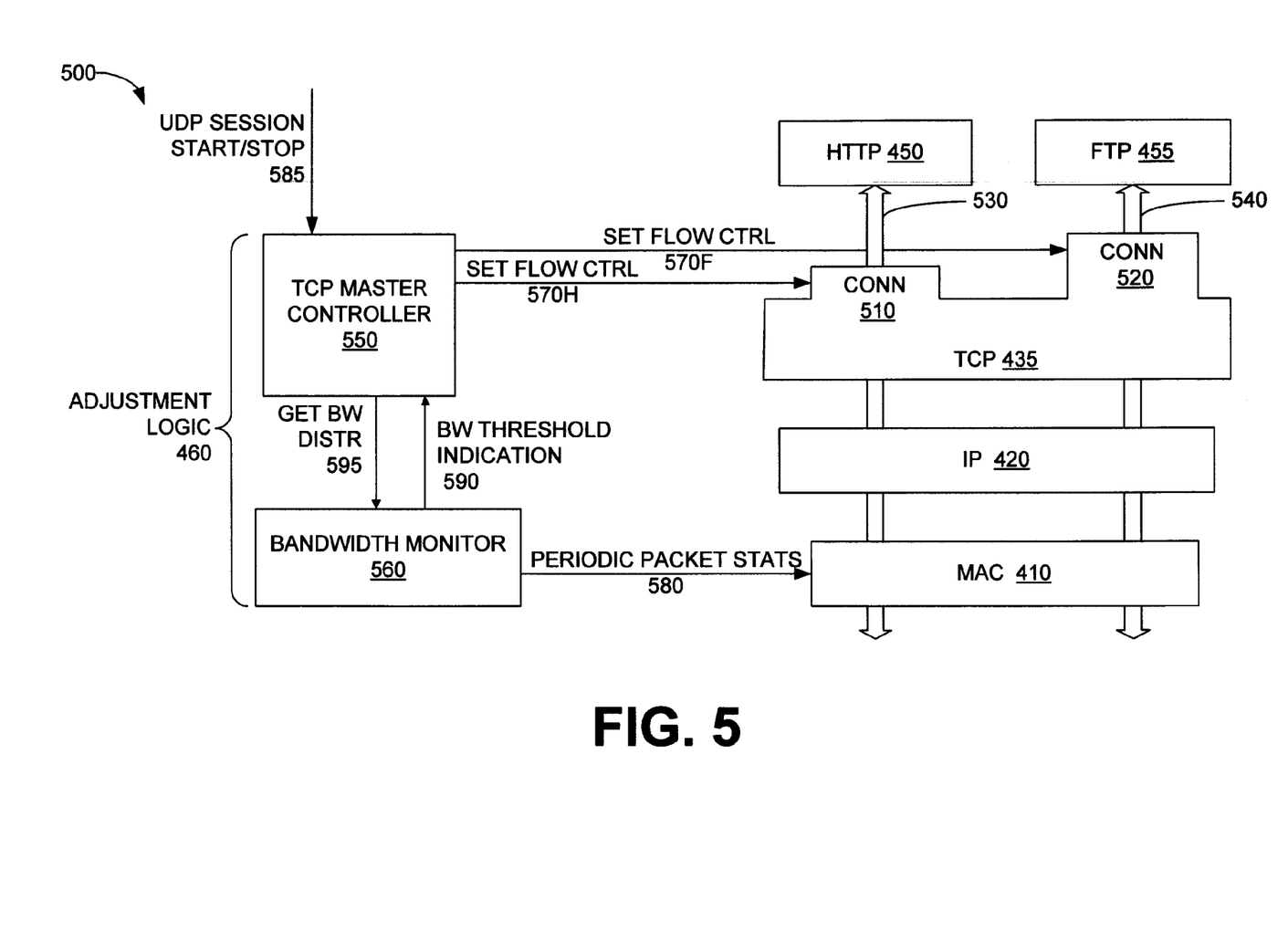
FIG. 5 is a data flow diagram showing the interaction of the logic for adjusting stream bandwidth of FIG. 4 with other components in the protocol stack of FIG. 4.

FIG. 5 is a data flow diagram 500 showing the interaction of the logic for adjusting stream bandwidth 460 with other components in the protocol stack 400. In this exemplary scenario, the TCP module 435 provides one socket 510 for the HTTP module 450, and another socket 520 for the FTP module 455. (As known by a person of ordinary skill in the art, a socket represents a TCP connection to a remote host.) The packet data path through socket 510 is shown by arrow 530, and the packet data path through socket 520 is shown by arrow 540.

The logic for adjusting stream bandwidth 460 comprises a TCP master controller 550 and a bandwidth monitor 560. The TCP master controller 550 uses a per-socket control interface (570H, 570F) provided by the TCP module 435 of this embodiment to set one or more flow control parameters for a particular socket or connection. Examples of the flow control parameters include the acknowledgement delay and the sliding window size, but a person of ordinary skill in the art should recognize that other flow control parameters are also possible, depending on the TCP implementation.

The TCP master controller 550 determines when to set connection flow control parameters, and what values to use, based on information provided by the bandwidth monitor 560. The bandwidth monitor 560 periodically queries the broadband MAC instance 410B (typically a device driver) through a MAC packet statistics interface 580. Through the packet statistics interface 580, the bandwidth monitor 560 determines the number of bytes received by the broadband MAC, on a per-stream basis. Using the periodically updated per-stream byte counts, the bandwidth monitor 560 can compute a total bandwidth in use on the subscriber loop 120, as well as the bandwidth used by each stream. The TCP master controller 550 is also notified when a UDP session is created or destroyed through interface 480, which allows the controller 550 to track the number of UDP sessions that are open at any particular time.

When the total bandwidth in use crosses over a threshold, the bandwidth monitor 560 notifies the TCP master controller 550 through an indication 590. (In some embodiments, this notification threshold is configurable.) If a UDP session is currently open, the TCP master controller 550 provides a query 595 to the bandwidth monitor 560 requesting the relative distribution of bandwidth usage among streams. The TCP master controller 550 determines which TCP streams are using the most bandwidth and an appropriate value to set for a flow control parameter on that stream. As one simple example, the sliding window size parameter may be reduced by half for the TCP stream with the highest bandwidth usage. As another simple example, the acknowledgement delay parameter may be increased by 25% for each TCP stream. In the first example, bandwidth is robbed only from the busiest TCP stream, while in the second example, the bandwidth reduction is shared by several streams, for example, in a proportional manner.

In another embodiment (not shown), the TCP control interface also allows the TCP master controller 550 to terminate, or disconnect, a TCP stream. In this embodiment, the TCP master controller 550 may completely disconnect one or more TCP streams in order to provide bandwidth for IP media streams.

A person of ordinary skill in the art should realize that a great variety of rules and criteria can be used within the TCP master controller 550 to adjust the per-stream TCP flow control parameters. The criteria used by a particular implementation of the TCP master controller 550 can be tuned based on empirical data and observations.

Returning now to per-stream statistics, the broadband MAC instance 410B maintains per-stream statistics as follows. As each incoming packet arrives, the broadband MAC instance 410B examines the packet's layer-3 and layer-4 headers. From these headers, the broadband MAC instance 410B determines whether the packet is an IP packet, and if so, the protocol type (e.g., TCP or UDP) and the port number in the packet. One embodiment maintains a separate counter for each protocol type—port number pair. A single counter is used for all non-IP packets (e.g., ARP, RARP, ICMP, etc.).

In another embodiment (not shown), the per-stream statistics are maintained by the IP module 420 rather than the broadband MAC instance 410B, and the bandwidth monitor 560 queries a packet statistics interface provided by the IP module 420. Although this embodiment does not track non-IP packets, this variation nonetheless provides an acceptable solution on those subscriber loops 120 in which non-IP traffic represents a small percentage of total bandwidth used.

Figure 6:
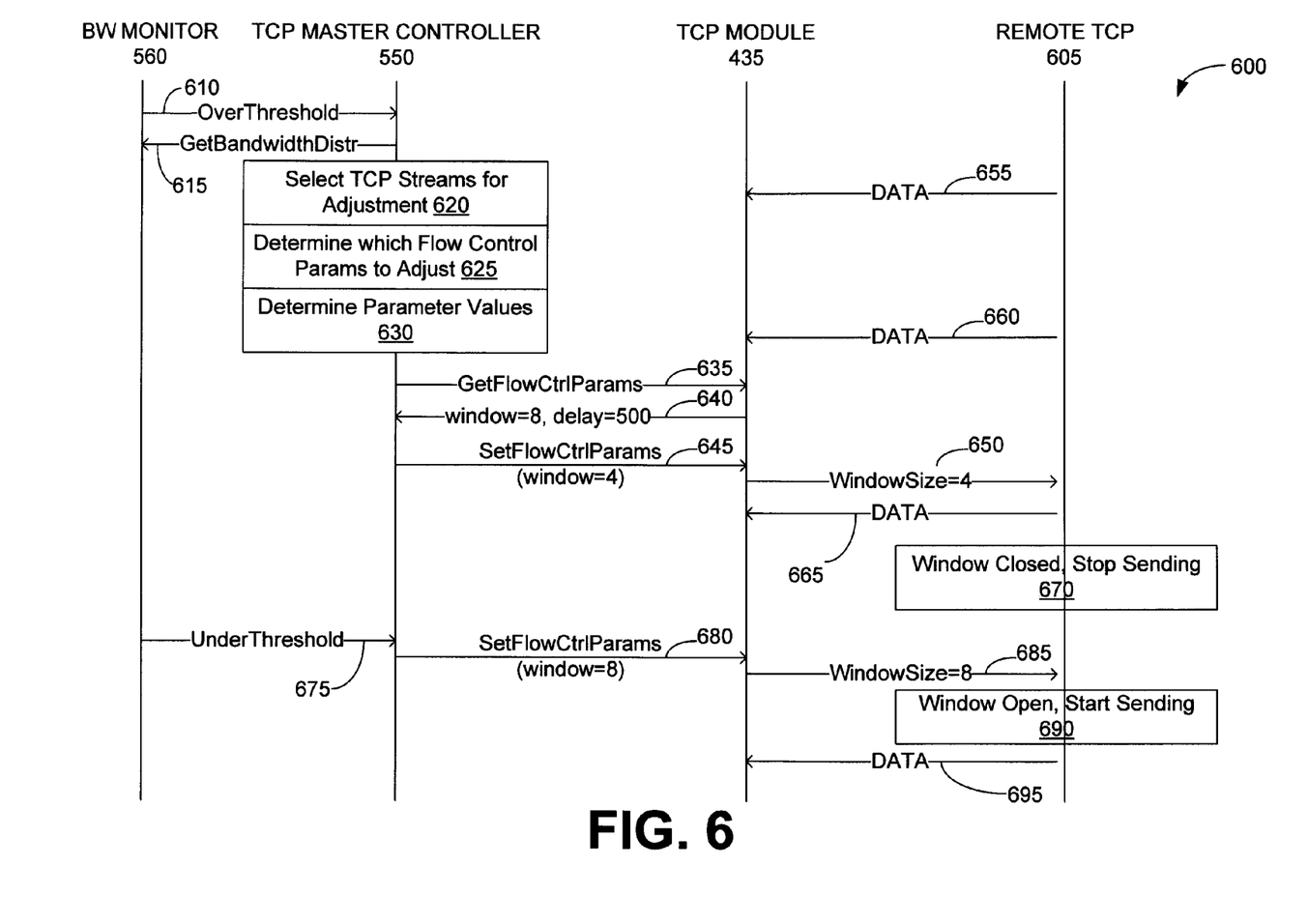
FIG. 6 is a message flow diagram showing one interactions between the components of the protocol stack of FIG. 4 in one example scenario.

FIG. 6 is a message flow diagram 600 depicting exemplary interactions between the components of the protocol stack 400. In addition to the bandwidth monitor 560, the TCP master controller 550, and the TCP module 435, this diagram also includes a remote peer 605 of the local TCP module 435. The example scenario of FIG. 6 begins with an indication 610 from the bandwidth monitor 560 to the TCP master controller 550 that the total bandwidth usage has gone over a threshold. In response, the TCP master controller 550 sends a query 615 to the bandwidth monitor 560 for the bandwidth distribution statistics. Using these statistics, the TCP master controller 550 selects (620) TCP streams for adjustment, determines (625) which flow control parameter(s) to adjust, and determines (630) appropriate values for the selected parameters.

Before setting the flow control parameters to these chosen values, the TCP master controller 550 sends a query 635 to the TCP module 435 for the current values of the flow control parameters for the selected streams. The TCP module 435 replies with a message 640 containing these values, which the TCP master controller 550 stores for later use. The TCP master controller 550 then uses the TCP module control interface (570H or 570F in FIG. 5) to send a message 645 setting the flow control parameters for the selected streams. In this example, the parameter chosen is the sliding window size, and the value chosen is 4, which is half of the original value.

The TCP module 435 eventually sends a message 650 with the new sliding window size to the remote TCP peer 605. As can be seen in FIG. 6, the remote TCP peer 605 has transmitted data at several earlier points in time (655, 660), and continues to transmit data one more time (665) after the window size update (645). However, at some point the remote transmitter window closes (670), and the remote peer slows down the rate of transmission, thus reducing the bandwidth used by this TCP stream.

With the remote transmitter slowed for some period of time using this technique, the total bandwidth usage in this scenario eventually drops below the threshold, and the bandwidth monitor 560 sends a notification 675 of this condition to the TCP master controller 550. In response, the TCP master controller 550 sends a message 680 adjusting the flow control parameters in the other direction in order to increase the remote rate of transmission (e.g., increasing the window size or decreasing the acknowledgement delay). In one embodiment, this flow control parameter is a value between the original value (at point 635) and the adjusted value (at point 645). At some point, the TCP module 435 transmits a message 685 containing the new sliding window size to the remote TCP peer 605, and eventually the window opens (690) and the remote TCP peer 605 increases the rate of data transmission (695).

At some point, an equilibrium state is reached, in which some bandwidth is left, but not enough for the TCP master controller 550 to trigger another increase. The flow control adjustment is done dynamically: if bandwidth usage increases to the maximum, the TCP master controller 550 reduces window size; but if there is too much bandwidth not in use, the TCP master controller 550 may increase the transmission rate so as not to waste too much bandwidth. When the TCP master controller 550 is notified through interface 585 that all UDP sessions are finished, the TCP master controller 550 can release all constraints on TCP streams.

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, or deleted depending on the functionality involved.

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable a person of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

At least the following is claimed:

1. A method, performed in a multimedia terminal adapter (MTA), of adjusting bandwidth of at least one of a plurality of Transport Control Protocol (TCP) streams carried on a subscriber loop, the method comprising:
    determining whether at least one user data protocol (UDP) session comprising at least one UDP stream is active on the subscriber loop;
    in response to the determination that the at least one UDP session is active on the subscriber loop, sending a query to a bandwidth monitor, wherein the query requests a current total bandwidth usage and a relative distribution of bandwidth usage among the plurality of TCP streams;
    receiving a notification from the bandwidth monitor indicating the current total bandwidth usage and the relative distribution of bandwidth usage among the plurality of TCP streams on the subscriber loop;
    comparing the current total bandwidth usage with a predetermined threshold;
    in response to the current bandwidth usage surpassing the predetermined threshold, selecting at least one of the plurality of TCP streams based on the relative distribution of the bandwidth carried on the subscriber loop, wherein the selected at least one of the TCP streams having the highest bandwidth usage among the plurality of TCP streams; and
    reducing the bandwidth usage for the selected at least one of the plurality of TCP streams by adjusting at least one flow control parameter for the selected at least one of the plurality of TCP streams, wherein adjusting the at least one flow control parameter for the selected at least one of the plurality of TCP streams comprises adjusting at least one of: a sliding window size and an acknowledgement delay.

2. The method of claim 1, wherein adjusting the at least one flow control parameter for the selected at least one of the plurality of TCP streams comprises decreasing the sliding window size of the selected TCP stream.

3. The method of claim 1, wherein adjusting the at least one flow control parameter for the selected at least one of the plurality of TCP streams comprises increasing the acknowledgement delay of the selected TCP stream.

4. A multimedia terminal adapter (MTA) comprising:
    memory having stored thereon a program code; and
    a processor that is programmed by at least the program code to enable the MTA to:
    determine whether at least one user data protocol (UDP) session comprising at least one UDP stream is active on a subscriber loop;
    in response to the determination that the at least one UDP session is active on the subscriber loop, send a query to a bandwidth monitor, wherein the query requests a current total bandwidth usage, and a relative distribution of bandwidth usage among a plurality of Transport Control Protocol (TCP) steams carried on the subscriber loop;
    receive a notification from the bandwidth monitor indicative that the current total bandwidth usage and the relative distribution of bandwidth usage among the plurality of TCP streams on the subscriber loop has crossed a threshold;
    compare the current total bandwidth usage with a predetermined threshold;
    in response to the current bandwidth usage surpassing the predetermined threshold, select at least one of the plurality of TCP streams based on the relative distribution of the bandwidth carried on the subscriber loop, wherein the selected at least one of the plurality of TCP streams having the highest bandwidth usage among the plurality of TCP streams; and
    reduce the bandwidth usage for the selected at least one of the plurality of TCP streams by adjusting at least one flow control parameter for the selected at least one of the plurality of TCP streams, wherein adjusting the at least one flow control parameter for the selected at least one of the plurality of TCP streams comprises adjusting at least one of: a sliding window size and an acknowledgement delay.

5. The MTA of claim 4, wherein adjusting the at least one flow control parameter for the selected at least one of the plurality of TCP streams comprises decreasing the sliding window size of the selected TCP stream.

6. The MTA of claim 4, wherein adjusting the at least one flow control parameter for the selected at least one of the plurality of TCP streams comprises increasing the acknowledgement delay of the selected TCP stream.

7. A non-transitory computer-readable medium having computer executable instructions stored thereon which, when executed by a computer, will cause the computer to:
    determine whether at least one user data protocol (UDP) session comprising at least one UDP stream is active on a subscriber loop;
    in response to the determination that the at least one UDP session is active on the subscriber loop, send a query to a bandwidth monitor, wherein the query requests a current total bandwidth usage, and a relative distribution of bandwidth usage among a plurality of Transport Control Protocol (TCP) steams carried on the subscriber loop;
    receive a notification from the bandwidth monitor indicative that the current total bandwidth usage, and the relative distribution of bandwidth usage among the plurality of TCP streams on the subscriber loop has crossed a threshold;
    compare the current total bandwidth usage with a predetermined threshold;

in response to the current bandwidth usage surpassing the predetermined threshold, select at least one of the plurality of TCP streams based on the relative distribution of the bandwidth carried on the subscriber loop, wherein the selected at least one of the TCP streams having the highest bandwidth usage among the plurality of TCP streams; and reduce the bandwidth usage for the selected at least one of the plurality of TCP streams by adjusting at least one flow control parameter of the selected TCP stream based on the relative distribution of the bandwidth, wherein adjusting the at least one flow control parameter for the selected at least one of the plurality of TCP streams comprises adjusting at least one of: a sliding window size and an acknowledgement delay.

8. The non-transitory computer readable medium of claim 7, wherein adjusting the at least one flow control parameter for the selected at least one of the plurality of TCP streams comprises decreasing the sliding window size of the selected TCP stream.

9. The non-transitory computer readable medium of claim 7, wherein adjusting the at least one flow control parameter for the selected at least one of the plurality of TCP streams comprises increasing the acknowledgement delay of the selected TCP stream.

10. The method of claim 1, further comprising:
determining when the UDP session on the MTA has ended; and
suspending, upon termination of the UDP session, the adjusting of the at least one flow control parameter.

11. The method of claim 1, wherein adjusting the at least one flow control parameter for the selected at least one of the plurality of TCP streams comprises terminating the selected at least one of the plurality of TCP streams.

12. The method of claim 10, further comprising:
determining the current amount of bandwidth in use after the end of the UDP session,
readjusting the at least one flow parameter of the at least one of the plurality of TCP streams based on the determined current bandwidth after the end of the UDP session.

13. The MTA of claim 12, wherein readjusting the at least one flow parameter of the at least one of the plurality of TCP streams based on the determined current bandwidth comprises undoing the adjustment of the at least one flow parameter for the at least one of the plurality of TCP stream.

14. The MTA of claim 4, wherein the processor is further programmed to enable the MTA to:
periodically query a broadband Media Access Control (MAC) layer instance in order to determine a number of bytes received by the broadband MAC layer instance on at least each of the plurality of TCP streams; and
compute the total current bandwidth in use on the subscriber loop based on the number of bytes received by the broadband MAC layer instance.

15. The MTA of claim 5, wherein decreasing the sliding window size of the selected TCP stream comprises decreasing the sliding window size by half.

16. The MTA of claim 6, wherein increasing the acknowledgement delay of the selected TCP stream comprises increasing the acknowledgement delay of the selected TCP stream by twenty-five percent.

17. The non-transitory computer readable medium of claim 7, wherein adjusting the at least one flow control parameter for the selected at least one of the plurality of TCP streams comprises terminating the selected at least one of the plurality of TCP streams.

18. The non-transitory computer readable medium of claim 7, wherein selecting at least one of the plurality of TCP streams comprises selecting the at least one of the TCP streams having the highest bandwidth usage.

19. The non-transitory computer readable medium of claim 7, further causing the computer to:
periodically query a broadband Media Access Control (MAC) layer instance in order to determine a number of bytes received by the broadband MAC layer instance on at least each of the plurality of TCP streams; and
compute the total current bandwidth in use on the subscriber loop based on the number of bytes received by the broadband MAC layer instance.

* * * * *